Sept. 9, 1941.   E. B. PERRINE   2,255,268
DIE APPARATUS FOR MAKING FILES
Filed Feb. 27, 1939   2 Sheets-Sheet 1

Inventor:
Emmett B. Perrine.
By Whiteley and Ruckman
Attorneys.

Sept. 9, 1941.   E. B. PERRINE   2,255,268
DIE APPARATUS FOR MAKING FILES
Filed Feb. 27, 1939   2 Sheets-Sheet 2
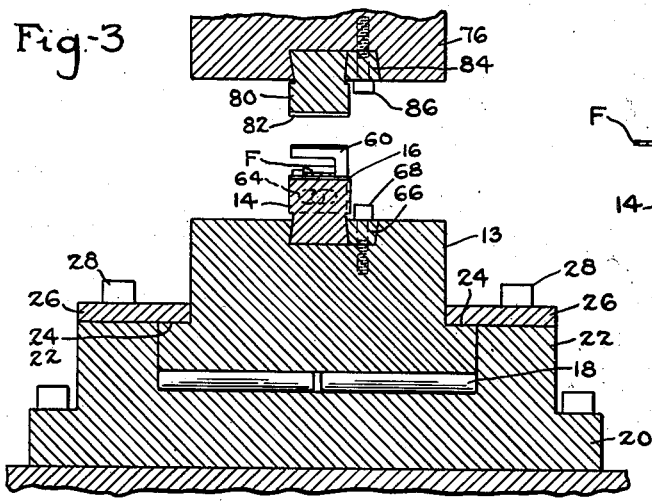
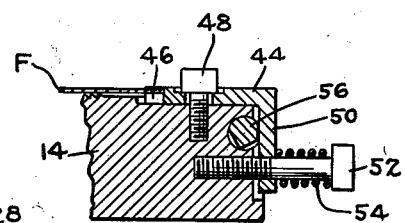
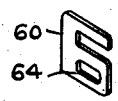
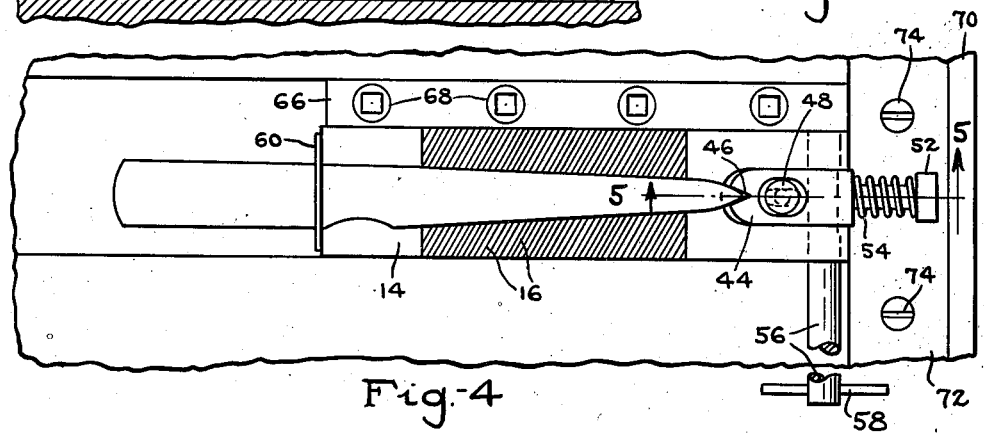
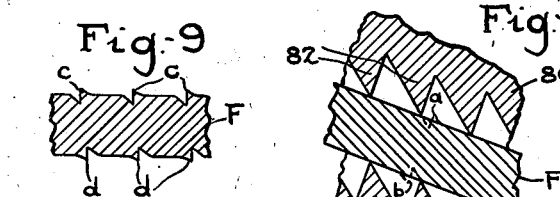
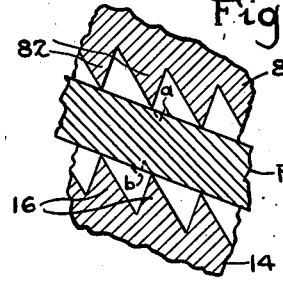
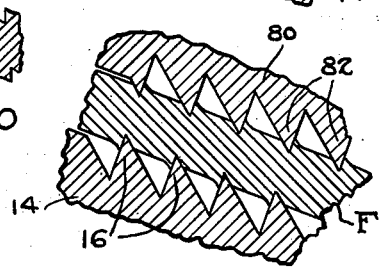
Inventor:
Emmett B. Perrine.
By Whiteley and Rackman
Attorneys.

Patented Sept. 9, 1941

2,255,268

UNITED STATES PATENT OFFICE 2,255,268

DIE APPARATUS FOR MAKING FILES

Emmett B. Perrine, Minneapolis, Minn.

Application February 27, 1939, Serial No. 258,615

8 Claims. (Cl. 76—14)

My invention relates to die apparatus for making files. It relates more particularly to apparatus for making files similar to those disclosed and claimed in my Patent No. 2,055,219, issued September 22, 1936, for a file comprising a body member having at least two sets of teeth with the teeth of one set inclined forwardly and the teeth of another set inclined backwardly and the teeth of the respective sets intermingled to provide cutting action for both forward and backward movement of the file.

One of the objects of this invention is the provision of an apparatus which will accurately and expeditiously make files of the character stated. A further object is to provide an apparatus embodying a die provided with forming teeth adapted to bite into a file blank to form teeth thereon and means whereby said blank and die may be given relative movement lengthwise of the blank when the teeth are in the blank. Another object is to provide an apparatus embodying two coacting dies each provided with forming teeth adapted to bite into opposite surfaces of an interposed file blank and means whereby said dies may be given relative movement lengthwise of the blank when the teeth are in the blank. Another object is to provide a die having forming teeth adapted to bite into a file blank, one face of each tooth being arranged to cause a shearing action and the opposite face being arranged to cause a swaging action. Another object is to provide a die having forming teeth adapted to bite into a file blank in combination with a multi-position gauge for varying the positioning of said blank longitudinally and means for causing the blank and die to have relative longitudinal movement lengthwise of the blank when the teeth are in the blank. Another object is to provide an adjustable gauge for the side of the file blank so that adjustment may be made for different widths of the blank.

The novel features which I believe to be characteristic of my invention are set forth with particularity in the appended claims. The invention itself, however, both as to its organization and method of operation, together with additional objects and advantages thereof, will be best understood from the following description of a specific embodiment when read in connection with the accompanying drawings in which, Fig. 1 is a side elevational view of the apparatus.

Fig. 3 is a view in section on the line 3—3 of Fig. 2 looking in the direction of the arrows.

Fig. 4 is a view in section on the line 4—4 of Fig. 2 looking in the direction of the arrows.

Fig. 5 is a view in section on the line 5—5 of Fig. 4 looking in the direction of the arrows.

Fig. 6 is a perspective view of a side gauge.

Fig. 7 is a fragmentary sectional view on an enlargement scale showing the teeth of the dies ready to bite into a file blank.

Fig. 8 is a view similar to Fig. 7 but showing the teeth of the dies after they have bitten into the file blank.

Fig. 9 is a fragmentary sectional view of the file after it has been acted upon the first time by the dies.

Fig. 10 is a view similar to Fig. 8, but showing the file after it has been turned over and again acted upon by the dies.

Fig. 11 is a plan view of a file after it has been acted upon the first time by the dies.

Fig. 12 is a plan view of a file after it has been acted upon another time by the dies.

Figure 1:
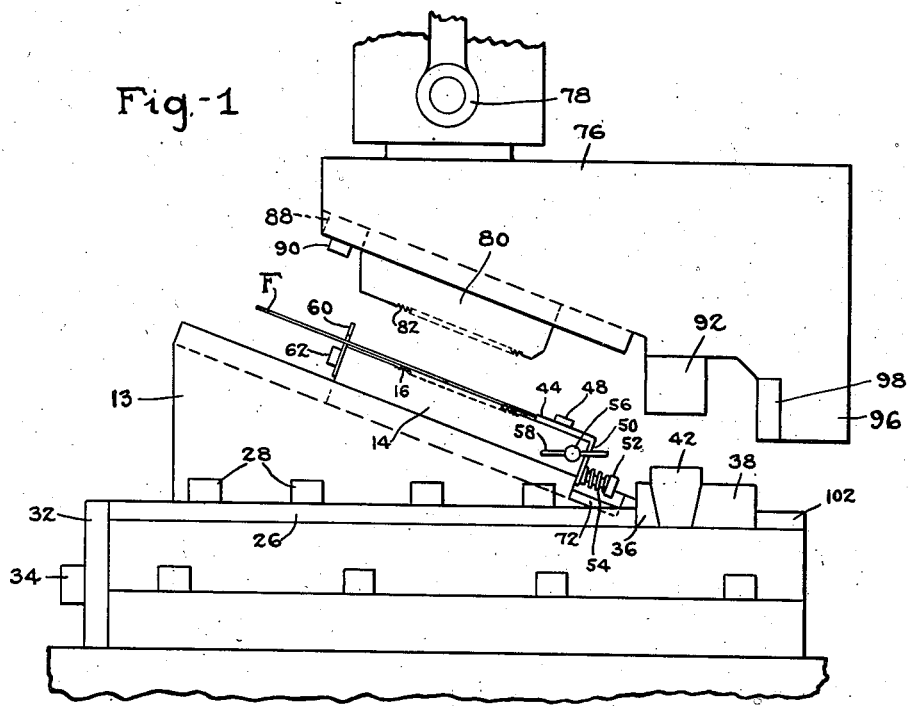

Referring to the particular construction shown in the drawings for purpose of illustration, the numeral 13 designates an anvil member carrying a die plate 14 provided with forming teeth 16 of the character shown in Figs. 7 and 8. The member 13 is supported on roller bearings 18 carried by a bed 20 which may be supported in any suitable manner. As shown in Fig. 3, the sides 22 of the bed extend upwardly and the lower portion of the member 13 fits between the sides 22. The upper portion of the member 13 is reduced to form shoulders 24 upon which fit plates 26 secured to the bed 20 by screws 28. Resilient means such as a block of rubber 30 is positioned between the rear wall of the anvil member 13 and a plate 32 secured to the bed 20 by screws 34. The resilient means 30 tends to hold the member 13 against a block 36 toward the front of the apparatus, this block being mounted for sliding movement toward the rear of the apparatus. The front wall of the block is inclined while the rear wall of a block 38 is oppositely inclined so that a wedge-shaped recess tapering downwardly is formed. The block 38 is secured to the bed 20 back of an upwardly extended front portion 40 of the bed and a strip 41 secured to the bed 20 between the lower ends of the blocks 36 and 38 limits the extent of movement of the block 36 toward the front. A downwardly tapered wedge 42 is positioned for sliding movement in the wedge-shaped recess. It will be understood that when the wedge 42 is forced downwardly as by means which will be described later, the anvil 13 with its die plate 14 will be moved rearwardly upon the rollers 18.

A gauge 44 is mounted upon the upper surface of the die 14 at the front thereof and is provided with a recess 46 to receive one end of a file blank F. The gauge 44 is adjustably held on the die 14 by means of a screw 48 turned into the die 14 and passing through a slot in the gauge. The front of this gauge is turned downwardly to form a front wall 50 containing a perforation through which a screw 52 is turned part way into the die 14. A spring 54 interposed between the head of the screw 52 and the wall 50 tends to hold the gauge wall 50 toward the front wall of the die 14. A recess in the front portion of the die 14 receives a rod-like member 56 having a plurality of faces disposed at different distances from the axial line of the recess as will be understood from Fig. 5. The member 56 may be given rotative movement by any suitable means such as a handle 58 secured thereto. It is evident from this description that the gauge and its recess 46 constitutes a multi-position gauge for varying the longitudinal positioning of the file blank F.

An adjustable side gauge 60 is secured to the rear of the die by means of a screw 62 passing through a slot 64 of the gauge and turned into the die 14. By loosening this screw, adjustment for different widths of file blanks may be readily made so that the center line of the blank will coincide with the center line of the die.

Figure 2:
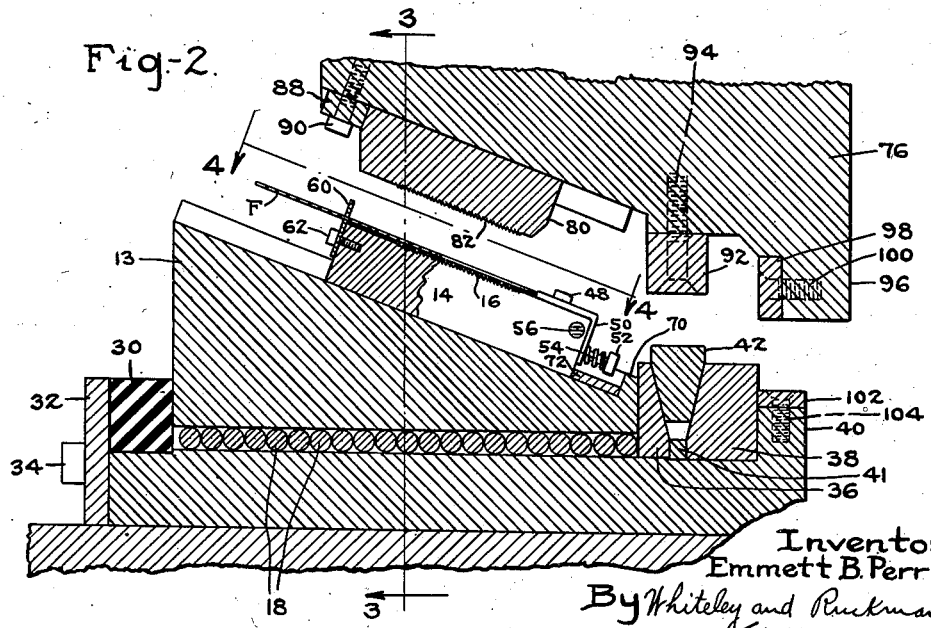
Fig. 2 is a view mostly in central vertical section.

As shown in Fig. 3, the lower portion of the die 14 is made dovetailed to fit into a dovetailed recess in the upper portion of the anvil member 13. In order to firmly hold the die in this recess, a wedge 66 secured therein by a screw 68, engages one side of the dovetailed portion of the die. As shown in Figs. 2 and 4, the front wall of anvil member 13 has an upward projection 70 back of which a strip 72 is held by screws 74 turned into the anvil. The front of the die 14 butts adjacent the strip 72 whereby the die is prevented from being thrust in forward direction on the anvil.

A plunger member 76 is adapted to be reciprocated vertically in well known manner as by a crank connection 78. The plunger member 76 carries a die plate 80 provided with forming teeth 82 of the character shown in Figs. 7 and 8. As shown in Fig. 3, the upper portion of the die 80 is made dovetailed to fit into a dovetailed recess in the lower portion of its plunger member 76. In order to firmly hold the die in this recess, a wedge 84 is secured therein by a screw 86 and engages one side of the dovetailed portion of the die. As shown in Figs. 1 and 2, the rear wall of the die 80 butts against a strip 88 secured by screws 90 turned into the plunger whereby the die 80 is prevented from being thrust in backward direction on the plunger. The reason for providing against backward thrust of the die 80 and forward thrust of the die 14 will become apparent later in connection with a description of the character of the forming teeth 16 and 82. The forward portion of the plunger 76 carries a hammer 92 secured to its lower side by screws 94. It is apparent that when the plunger 76 descends, the hammer 92 will strike the wedge 42 as the teeth 16 and 82 are entering the lower and upper surfaces of the file blank, and the anvil 13 and its die 14 will be thrust in backward direction. The result of this action will later be explained in connection with Figs. 7 and 8. The forward portion of the plunger 76 has a downward extension 96 with an inner vertical face to which a plate 98 is secured by screws 100. When the teeth of the two dies are starting to enter the upper and lower surfaces of the file blank, the plate 98 fits nicely in front of the block 38 so that tendency of the plunger to be thrust toward the rear of the apparatus is resisted. The top of the bed extension 40 is provided with a plate 102 secured thereto by screws 104. The plate 102 serves to determine the extent of downward movement of the plunger 76.

Referring to Figs. 7 and 8 which are greatly enlarged views, it will be seen that the rear faces of the die teeth 82 are much more inclined from a vertical than is the case with the front faces of these teeth. The die teeth 16 are reversely disposed, that is, their front faces are much more inclined from a vertical than the rear faces are. It is to be remembered that while the die teeth are entering the file blank, the anvil 13 and its die 14 are being forced backwardly by the wedge 42, and that the plunger 76 and its die 80 are prevented from having any of this backward movement. The front faces of the teeth 82 tend to prevent this backward movement of the file blank while the rear faces of the teeth 16 tend to cause backward movement of the file blank. The result is that the file blank will be carried backwardly only half as far as the anvil die travels. The upper and lower die teeth will therefore bite into the file blank in the manner indicated in Fig. 7 by the dotted lines $a$ and $b$ respectively. The rear faces of the plunger teeth 82 will enter the file blank with a shearing action while the front faces of these teeth will have a swaging action on the file blank. This action is reversed for the anvil teeth 16 so that the front faces of these teeth enter the file blank with a shearing action while their rear faces will have a swaging action. The result is that teeth such as indicated in Fig. 9 at $c$ and $d$ will be provided for the file.

Referring again to Figs. 7 and 8, it will be noted that each die tooth 16 of the anvil die has a face 15 which is substantially perpendicular to the supported surface of the blank F and a second face 17 which slopes away from the vertical face 15 at an angle of substantially 50°. Also, each die tooth 82 of the movable die 80 is similarly provided with a vertically disposed face 81 and a sloping face 83. The respective die teeth 16 and 82 are relatively positioned as shown in Fig. 7, so that when the blank F is in position resting on the die tooth 16 with their surfaces 15 in a plane vertical to the surfaces of the blank F, at the moment the points of die teeth 82 engage the top surface of blank F the oppositely sloping faces 17 of die teeth 16 and 83 of die teeth 82 will fall substantially in common planes. The component of the thrusts of the die teeth 17 and 82 into the blank F as it is moved by the anvil 14 relative to the movable die 80 is along this plane, so that the force exerted upon the blank by the respective die teeth 16 and 82 falling in these common planes is exerted in opposition and the tendency to move the blank in one direction by the die teeth 16 entering the underside of the blank F is exactly offset by the tendency to move the blank in the opposite direction by the die teeth 82 on the movable die. The die teeth on both the anvil and the movable die cross the file blank at the same angle on both sides. The relative movement of the anvil, holding the blank relative to the movable die is, therefore, a movement of the blank relative to the crossing die teeth whatever their angle. The complementary force exerted by the gripping of the blank between the teeth of the anvil and of the movable blank taken with the movement of the two sets of die teeth relative to the faces of the blank are what cause the metal of the blank to be literally pushed forward against the vertical faces 15 and 81 of the crossing die teeth to cause the resulting file teeth formed in the blank to be lifted in a sharp edge, as clearly shown in Fig. 9.

By referring to Fig. 4, it will be seen that the teeth 16 extend obliquely across the face of the die 14. The teeth 82 extend obliquely in the same direction across the face of the die 80, so that the upper surface of the file blank is provided with teeth c as indicated in Fig. 11. It is obvious that the lower surface of the blank will have its teeth d extending parallel with the teeth c. Now when the blank is turned over and again acted upon by the dies, the obliquity of the teeth for upper and lower surfaces of the blank will be reversed and both surfaces will have criss-cross teeth as shown in Fig. 12, the appearance of the completed file teeth being shown in longitudinal section in Fig. 10.

However, before the file blank is turned over during the forming operation, it has been found desirable in making fine files to provide the dies with teeth which are spaced from each other two or more times the distance which the teeth of the file are to be spaced from each other. When the teeth of the dies are finely spaced, it is difficult to form them properly so that they will accurately produce the teeth on the file. Therefore the multi-position gauge has been provided in which the portion of the rod-like member 56 in engagement with the spring stressed portion 50 of the gauge is provided with four faces as shown in Fig. 5 which are at different distances from the axial line of the rod and of the recess in which the rod may be turned. When this expedient is used, it will be understood that the dies are made to approach each other two or more times before turning over the file blank, and that the rod 56 is given rotative movement between each die action to bring the succeeding face of the rod into engagement with the member 50 of the gauge.

While for some purposes, it may not be necessary to provide die faces which are inclined out of a horizontal, I have found that such arrangement gives better results. This is because the inclination in practical application of the apparatus takes advantage of the fact that the necessary relative movement between the dies lengthwise of the file blank is lessened in proportion as the angle of the blank out of a horizontal is increased. While certain mechanical difficulties are encountered if this angle is made too great, I have found that the angle substantially as shown in Figs. 1 and 2 gives extremely good results.

The operation and advantages of my invention have been quite fully stated in the foregoing description. It should be mentioned however that while one face of each die tooth acts largely with a swaging action to turn up a file tooth on the blank, the other face acts with a shearing action which gives a more accurate and more finely formed tooth for the file and a longer life of the die by reducing the strain on its teeth to a minimum. By referring to Figs. 1, 2 and 4, it will be seen that the extended end portions of both dies have flat surfaces which are removed from the plane of the cutting edges of the teeth by an amount slightly in excess of the depth of the teeth going into the file blank. In other words, there is only a very slight space between these flat portions and the blank when the teeth are in the blank to the maximum depth which they go. This formation of the end portions of the die prevents a thin metal blank from curling at the ends when the teeth bite into the blank. As previously explained, the file blank is carried backwardly substantially only half as far as the anvil die moves backwardly when the die teeth are acting upon the blank. The resilience of the spring 54 permits this excess of movement of the die over that of the blank. By referring to Figs. 1 and 2, it will be understood that the side gauge 60 also serves as a safety guard for the fingers of the operator who stands at the rear of the machine and positions the file blanks between the dies to be operated upon. The construction of a file with a surface provided with two sets of teeth with the teeth of one set inclined forwardly and the teeth of the other set inclined backwardly and the teeth of the two sets intermingled or interspersed, results in providing a file which will make a clean cut at all points of its forward and backward movement and which will cut more speedily than is the case with files now commonly in use, and especially those made for finger nail files.

I claim:

1. In a die apparatus for making files, the combination of a reciprocating die provided with a series of forming teeth, an anvil die provided with a series of similar teeth, means for mounting said anvil die for lateral movement, means for positioning a file blank between said dies whereby the movement of said reciprocating die in one direction causes said teeth to bite into opposite surfaces of said blank, and means operated by said reciprocating die for causing lateral movement of said anvil die lengthwise of the blank when said teeth are in the blank.

2. In a die apparatus for making files, the combination of two coacting dies each provided with a series of forming teeth, means for positioning a file blank between said dies, means whereby said dies may be made to approach each other to cause said teeth to bite into opposite surfaces of said blank, and means for causing said dies to have relative movement lengthwise of the blank when said teeth are in the blank, the end portions of said dies having flat surfaces which are removed from the plane of the cutting edges of the teeth by an amount slightly in excess of the depth which the teeth go into the blank whereby the ends of the blank are prevented from curling when the teeth bite into the blank.

3. In a die apparatus for making files, the combination of a die provided with a series of forming teeth, a stop gauge resiliently carried by said die for positioning a file blank in proximity to said die, means for causing said teeth to bite into said blank, and means for causing said blank and die to have relative movement lengthwise of the blank when said teeth are in the blank, the resilience of said stop gauge permitting said relative movement.

4. In a die apparatus for making files, the combination of a reciprocating die provided with a series of forming teeth, an anvil die provided with a series of reversely arranged teeth, a stop gauge resiliently carried by said anvil die for positioning a file blank between said dies whereby the movement of said reciprocating die in one direction causes said teeth to bite into opposite surfaces of said blank, and means for causing said anvil die to have movement lengthwise of the blank and said blank to simultaneously move lengthwise substantially one-half this distance when said teeth are in the blank, the resilience of said stop gauge permitting said movements.

5. Means for making files, comprising an anvil adapted to hold a file blank in position thereon, a toothed die, means to cause the file blank so held and the die to be moved relatively so that a face of the file blank will be engaged by the die to force the die teeth into the blank, and means to effect a second and positive relative movement of the blank and said die teeth along the plane of the engaged face of the blank after the teeth enter and while they are being embedded in said blank to cause upward sharpening lift to the teeth so formed on the blank.

6. Means for making files, comprising an anvil formed with a multiplicity of die teeth all extending in the same direction and sloping in one direction and adapted to hold a file blank positioned on said teeth so all said teeth cross the same, a second die spaced from the first named die formed with a multiplicity of die teeth all extending in the same direction as the anvil die teeth but having faces sloping in the opposite direction and positioned to engage a face of the file blank so as to cross the same, means to cause the anvil and die to move toward one another so that all of the die teeth of each of the respective dies will be caused to engage simultaneously the opposite faces of the file blank simultaneously to force both sets of die teeth through said opposite faces and into the body of the blank, and means to move the anvil and the file blank thereon crosswise of the extent of the die teeth as the die teeth enter and while they are being embedded in said blank to cause the engaged fronts of the die teeth to effect sharpening lift of the respective sets of teeth so formed on opposite sides of the blank.

7. Means for making files, comprising an anvil provided with die teeth, said teeth being formed with substantially vertical and sloping faces relative to the surface of the file blank held thereon, a movable die having corresponding teeth with substantially vertical and sloping faces, said sloping faces extending in opposite directions from the sloping faces of the anvil teeth, means to move the anvil and die relatively toward one another to grip the file blank between them and simultaneously to force both sets of die teeth into opposite faces of the file blank, means to effect a second and positive relative movement of the respective sets of die teeth so as to cause the vertical planes of said respective sets to change their relative position crosswise along the faces of the file blank after the teeth enter and while they are being embedded in said blank to cause upward sharpening lift to the teeth so formed on the blank.

8. Means for making files, comprising two relatively reciprocable die members spaced from each other so as to be adapted to receive a file blank between them, each of said members being formed with sets of parallel die teeth adapted to extend across the faces of the file blank and having substantially vertical and sloping faces relative to the faces of the file blank held between them, the edges of said die teeth and the faces of said blank lying in parallel planes oblique to the direction of relative reciprocating movement of the die members, said sloping faces of one set of die teeth extending in opposite directions from the sloping faces of the other set of die teeth, and means to cause the members to be relatively reciprocated in said direction oblique to the planes of the die teeth edges and to the faces of the file blank, to grip the file blank and simultaneously to force both sets of die teeth into the opposite faces of the file blank.

EMMETT B. PERRINE.